United States Patent Office 2,951,039
Patented Aug. 30, 1960

2,951,039

PENETRANT COMPOSITION

Samuel H. Salisbury and Chester M. White, Rochester, N.Y., assignors to Olin Mathieson Chemical Corporation, a corporation of Virginia No Drawing. Filed Nov. 15, 1955, Ser. No. 547,048

5 Claims. (Cl. 252—33.3)

Our invention relates to a penetrant composition.

A penetrant is a liquid product which is applied to rusted nuts, bolts, flanges, couplings, unions, fittings, studs, joints, screws, pipe threads or any corroded threads or tight parts. The product is applied to the frozen object and allowed to remain in contact with the part for at least ten minutes, after which the part is tapped with a hammer and force is applied in an effort to crack the joint. If the joint is a particularly bad one, more soaking time may be employed.

A penetrant should have various properties. Thus it should have a low rate of evaporation and remain at the point of attack. Moreover, a penetrant should seep through and soften the rest and at the same time provide lubrication. Also, a penetrant should be non-corrosive to metals, inert to fabrics, non-inflammable, non-odoriferous and non-irritating to the hands and eyes.

In accordance with our present invention, we have discovered penetrant compositions which possess the foregoing properties to an excellent degree. As distinguished from the presently known commercial products, which are of an oil base type, the new composition which we have invented has a water base and essentially comprises from 50 to 95 percent of water, from 0.5 to 5 percent of a water-soluble wetting agent and from 3 to 35 percent of ammonia or an alkanol amine, alkanol-ammonium hydroxide or ammonium salt of a hydroxy carboxylic aliphatic acid or mixture thereof. The percentage ranges just given are based upon the combined weight of the aforementioned ingredients.

In addition, the compositions of our invention can, if desired, contain various other ingredients designed to improve their properties, such as lower alcohols or glycols which serve as freezing point depressants, corrosion inhibitors, dyes and so forth. Where used, the amount of lower alcohols or glycols will be about 5 to 25 percent, based upon the combined weight of the water, water-soluble wetting agent and ammonia, alkanol amine, alkanol-ammonium hydroxide or ammonium salt of a hydroxy carboxylic acid. Also, where used the corrosion inhibitor and dye will amount to a very small amount by weight, based upon the total weight of the penetrant composition, generally being less than 1 percent by weight.

The following examples illustrate in detail various compositions which fall within the broad scope of our invention. These compositions were prepared simply by mixing the various ingredients in the stated percentages by weight.

EXAMPLE I

| | Percent |
|---|---|
| Sodium dodecyl benzene sulfonate solution in water (25.5 weight percent sulfonate) | 5.00 |
| Polyamine T [1] | 25.00 |
| Water | 57.25 |
| Methyl alcohol | 12.50 |
| Linoleic acid dimer solution in naphtha (50 weight percent dimer) | 0.20 |
| Nigrosine dye | 0.05 |
| | 100.00 |

[1] A proprietary product, being still bottoms residue from the distillation of triethanolamine formed by reacting ethylene oxide with ammonia and of the probable formula:

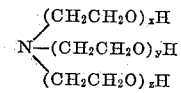

wherein the sum of $x$, $y$ and $z$ is at least four. The product has the following characteristics:

| | |
|---|---|
| Specific gravity, 20/20° C. | 1.120–1.160. |
| Equivalent weight | 145–165. |
| Water | 10% (by weight) maximum. |
| Flash point | 375° F. (Cleveland Open Cup). |

EXAMPLE II

| | Percent |
|---|---|
| Sodium dodecyl benzene sulfonate solution in water (25.5 weight percent sulfonate) | 5.00 |
| Monoethanolamine | 25.00 |
| Water | 70.00 |
| | 100.00 |

EXAMPLE III

| | Percent |
|---|---|
| Sodium dodecyl benzene sulfonate solution in water (25.5 weight percent sulfonate) | 5.00 |
| Tetraethanolammonium hydroxide | 25.00 |
| Water | 70.00 |
| | 100.00 |

EXAMPLE IV

| | Percent |
|---|---|
| Sodium dodecyl benzene sulfonate solution in water (25.5 weight percent sulfonate) | 5.00 |
| NH₄OH (19.1 weight percent NH₃) | 15.00 |
| Butanol | 10.00 |
| Water | 70.00 |
| | 100.00 |

EXAMPLE V

| | Percent |
|---|---|
| Sodium dodecyl benzene sulfonate solution in water (25.5 weight percent sulfonate) | 5.00 |
| Polyamine T | 25.00 |
| Methanol | 10.00 |
| Water | 59.75 |
| Nigrosine dye | 0.05 |
| Linoleic acid dimer solution in naphtha (50 weight percent dimer) | 0.20 |
| Total | 100.00 |

EXAMPLE VI

| | Percent |
|---|---|
| Sodium ethyl benzene sulfonate solution in water (25 weight percent sulfonate) | 5.00 |
| Ammonium citrate | 25.00 |
| Antifreeze grade ethylene glycol | 10.00 |
| Linoleic acid dimer solution in naphtha (50 weight percent dimer) | 0.20 |
| Nigrosine dye | 0.05 |
| Water | 59.75 |
| | 100.00 |

Each of the six products described in the examples was tested and compared with competitive products by the following procedure. New bolts and nuts (1" by ⅜") were thoroughly degreased. Then two nuts were threaded on a bolt and one nut was set against the other one to 250 inch-pounds by means of a torque wrench. Then these bolts and nuts were soaked in salt brine (5%) for 24 hours, after which the salt solution was drained off and the bolts were placed in a humidity cabinet for 5 days at 100° F. After removal from the cabinet, they were spread out to dry on a concrete floor for at least two weeks. These bolts and nuts were treated with the experimental composition (or competitive product of an oil base type) for 10 minutes. The force required to loosen the nut was determined by the torque wrench. It was essential to run at least 25 bolts and average the release pressure for each test. Also a blank was run on the rusted bolts each day, since the release pressures tend to increase with time. The results of these tests are set forth in Table I below and they show that the compositions of our invention were considerably more effective than the known oil base type penetrant compositions.

*Table I*

| | Control, Inch-pounds | Test Fluid, Inch-pounds | Difference, Inch-pounds |
|---|---|---|---|
| Competitive Fluid: | | | |
| A | 370 | 360 | −10 |
| B | 419 | 406 | −13 |
| C | 539 | 523 | −16 |
| D | 641 | 633 | −8 |
| E | 526 | 517 | −9 |
| F | 561 | 555 | −6 |
| Example I | 380 | 343 | −37 |
| Example II | 483 | 426 | −57 |
| Example III | 464 | 414 | −50 |
| Example IV | 539 | 484 | −55 |
| Example V | 380 | 343 | −37 |
| Example VI | 641 | 600 | −41 |

A further product of our invention which has been found particularly useful has the following composition by weight:

| | Percent |
|---|---|
| Sodium dodecyl benzene sulfonate solution in water (25.5 weight percent sulfonate) | 5.00 |
| Monoethanolamine | 12.50 |
| Isopropanol (99% purity) | 18.50 |
| Linoleic acid dimer solution in naphtha (50 weight percent dimer) | 0.20 |
| Nigrosine dye | 0.05 |
| Water | 63.75 |

Various modifications can be made in the specific compositions of the examples to provide other penetrant compositions which fall within the broad scope of our invention. Thus, in place of the specific wetting agents used there can be employed a wide variety of other water-soluble wetting agents of which a great many are known. Thus, in preparing our composition we can employ alkali metal alkyl aryl sulfonates, usually alkyl benzene sodium sulfonates or alkyl naphthalene sodium sulfonates, for example, diamyl benzene sodium sulfonate, triamylbenzene sodium sulfonate, monokeryl benzene sodium sulfonate and the corresponding compounds prepared using toluene or xylene rather than benzene, dodecyl benzene sodium sulfonate, tetrapropylene benzene sodium sulfonate, monobutyl diphenyl sodium monosulfonate, dibutyl phenylphenol sodium sulfonate, dipropyl naphthalene sodium sulfonate, monobutyl naphthalene sodium sulfonate, dibutyl naphthalene sodium sulfonate, monocapryl naphthalene sodium sulfonate and so forth.

As the wetting agent, there can also be employed the alkali metal salts of sulfated alcohols, such as sodium dodecyl sulfate, sodium tetradecyl sulfate or sodium oleyl sulfate; polyoxyalkylated ethers of alkyl phenols or fatty alcohols, such as the reaction product of normal phenol with 15 moles of ethylene oxide, or 10-polyoxyethylene monostearate; the sodium salt of ethylene diamine tetraacetic acid or any other water-soluble wetting agent which does not give an acid reaction.

Various alkanol amines, alkanolammonium hydroxides or ammonium salts of hydroxy carboxylic aliphatic acids can be substituted for those shown in the specific examples, diethanolamine, triethanolamine, monoisopropanolamine, diisopropanolamine, triisopropanolamine, tetraisopropanol ammonium hydroxide, ammonium tartrate, ammonium ricinoleate, and the like being suitable.

Where the penetrant composition contains an antifreeze component to increase its utility at low temperatures, such component can be ethyl alcohol, isopropyl alcohol, normal propyl alcohol, isobutyl alcohol, propylene glycol, diethylene glycol and the like, as well as the methyl alcohol, butyl alcohol and ethylene glycol shown in the specific examples. Also, if desired, other water-soluble corrosion inhibitors, of which a great many are known in the art, can be utilized in place of the Santolene C. Particularly suitable rust inhibitors are the dimeric and trimeric acids produced by the condensation of unsaturated aliphatic monocarboxylic acids having between 16 and 18 carbon atoms per molecule and the dimeric and trimeric acids produced by the condensation of hydroxyl aliphatic monocarboxylic acids having between 16 and 18 carbon atoms per molecule. Such materials are described in Landis and Backensto Patent 2,632,695, issued March 24, 1953.

We claim:

1. A penetrant composition comprising essentially from 50 to 95 percent of water, from 0.5 to 5 percent of a sodium alkyl aryl sulfonate and from 3 to 35 percent of a material selected from the group consisting of alkanolamines having at least 2 carbon atoms per molecule and having an equivalent weight up to about 165, alkanolammonium hydroxides having from about 8 to 12 carbon atoms per molecule and ammonium salts of hydroxy carboxylic aliphatic acids having from about 4 to 18 carbon atoms per molecule, the percentages being based upon the combined weight of water, wetting agent, and said material, and a minor proportion of a corrosion inhibitor.

2. The composition of claim 1 wherein said material in an alkanolamine having at least 2 carbon atoms per molecule and having an equivalent weight up to about 165.

3. The composition of claim 1 wherein said wetting agent is a sodium dodecyl benzene sulfonate and wherein said material is monoethanolamine.

4. A penetrant composition consisting essentially of from 50 to 95 percent of water, from 0.5 to 5 percent of a sodium alkyl aryl sulfonate and from 3 to 35 percent of monoethanolamine, the percentages being based upon the combined weight of water, sulfonate and monoethanolamine, said composition also containing from 5 to 25 percent by weight of a lower saturated monohydric alcohol having from 1 to 4 carbon atoms per molecule, based upon the combined weight of the water, sulfonate and monoethanolamine and a minor proportion of a corrosion inhibitor.

5. A penetrant composition consisting essentially of about 67.5 percent of water, about 1.3 percent of sodium dodecyl benzene sulfonate, about 12.5 percent of monoethanolamine, about 18.5 percent of isopropanol, about 0.2 percent of linoleic acid dimer solution in naphtha, the percentages being based upon the weight of the total composition.

References Cited in the file of this patent

UNITED STATES PATENTS

| | | |
|---|---|---|
| 1,459,910 | Gravely | June 26, 1923 |
| 2,283,199 | Flett | May 19, 1942 |
| 2,474,325 | Rodgers et al. | June 28, 1949 |
| 2,540,003 | McCoy | Jan. 30, 1951 |
| 2,554,913 | Kimball | May 29, 1951 |
| 2,674,580 | Henkin | Apr. 6, 1954 |
| 2,780,598 | Cafcas | Feb. 5, 1957 |
| 2,825,693 | Beaubien et al. | Mar. 4, 1958 |

FOREIGN PATENTS

| | | |
|---|---|---|
| 151,952 | Australia | June 18, 1953 |